(12) United States Patent
Bird

(10) Patent No.: US 6,564,884 B2
(45) Date of Patent: May 20, 2003

(54) WEAR PROTECTION ON A ROCK BIT

(75) Inventor: Jay S. Bird, Cedar Hill, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 4 days.

(21) Appl. No.: 09/872,494

(22) Filed: May 31, 2001

(65) Prior Publication Data
US 2002/0017402 A1 Feb. 14, 2002

Related U.S. Application Data
(60) Provisional application No. 60/220,576, filed on Jul. 25, 2000.

(51) Int. Cl.$^7$ .............................................. E21B 10/52
(52) U.S. Cl. ...................... 175/57; 175/374; 175/435; 175/428; 148/903; 76/108.2; 408/145; 427/422
(58) Field of Search ..................... 175/57, 426, 324, 175/425, 435, 331, 431, 428; 148/903, 905; 408/144, 145; 76/108.2, DIG. 12; 427/410, 422

(56) References Cited

U.S. PATENT DOCUMENTS

| 4,168,923 A | * | 9/1979 | Vezirian |
| 4,781,770 A | * | 11/1988 | Kar |
| 4,884,477 A | * | 12/1989 | Smith et al. |
| 4,911,254 A | * | 3/1990 | Keith |
| 5,279,374 A | * | 1/1994 | Sievers et al. |
| 5,535,838 A | * | 7/1996 | Keshavan et al. |
| 5,833,020 A | * | 11/1998 | Portwood et al. |

* cited by examiner

Primary Examiner—Roger Schoeppel
(74) Attorney, Agent, or Firm—Robert O. Groover, III

(57) ABSTRACT

Using inserts which are welded in place allows the use of hardfacing in the immediate vicinity of the inserts. Areas of high wear, such as cutting structures and gage areas, can use a combination of ultra-hard inserts with hardfacing for protection against wear. The inserts slows wear, while the hardfacing prevents erosion around the inserts.

26 Claims, 4 Drawing Sheets

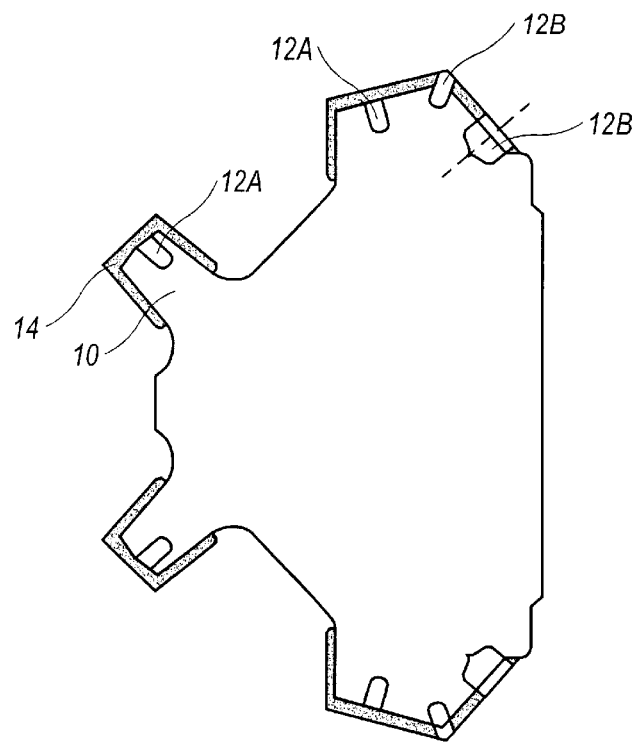
FIG. 1
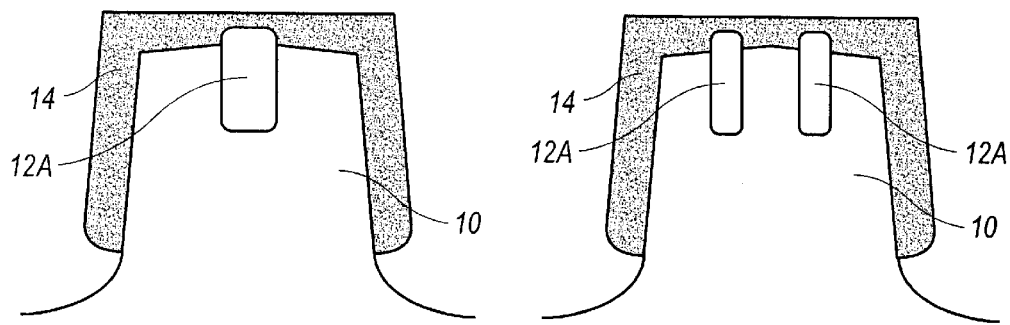
FIG. 2A  FIG. 2B

WEAR PROTECTION ON A ROCK BIT

This application claims priority from U.S. Provisional Application No. 60/220,576, filed Jul. 25, 2000, which is hereby incorporated by reference.

BACKGROUND AND SUMMARY OF THE INVENTION

The present invention relates to drill bits used in oil and gas drilling, and especially to the use of inserts and hardfacings thereon.

BACKGROUND

Rotary Drilling

Oil wells and gas wells are drilled by a process of rotary drilling, using a drill rig such as is shown in FIG. 4. In conventional vertical drilling, a drill bit 410 is mounted on the end of a drill string 412 (drill pipe plus drill collars), which may be miles long, while surface equipment 414 turns the drill string, including the bit at the bottom of the hole.

Two main types of drill bits are in use, one being the roller cone bit, an example of which is seen in FIG. 6. In this bit a set of cones 616 (two are visible) are arranged on rugged bearings such that when the drill string to which they are connected is rotated, each cone will separately rotate about its separate axis along the bottom of the borehole. The cones will generally have either milled teeth cut out of the same steel of which the cones are made or inserts 12 of a harder material than the steel cone. The teeth generally work in a gouging, scraping motion to remove softer formations, while inserts are generally preferred for harder formations, where their hardness, combined with the weight on the bit, acts to fracture the rock, which is then swept by the circulating mud.

The second type of drill bit is a drag bit, having no moving parts, seen in FIG. 5. These bits are increasingly popular, especially in softer formations. Like rotary cone bits, they can also carry either milled teeth or harder inserts.

During drilling operations, drilling fluid, commonly referred to as "mud", is pumped down through the drill string and out nozzles 628 in the drill bit. The flow of the mud is one of the most important factors in the operation of the drill bit, serving to remove the cuttings which are sheared from rock formations by the drill bit, to cool the drill bit and teeth, and to wash away accumulations of soft material which can clog the bit.

When the bit wears out or breaks during drilling, it must be brought up out of the hole. This requires a process called "tripping": a heavy hoist pulls the entire drill string out of the hole, in stages of (for example) about ninety feet at a time. After each stage of lifting, one "stand" of pipe is unscrewed and laid aside for reassembly (while the weight of the drill string is temporarily supported by another mechanism). Since the total weight of the drill string may be hundreds of tons, and the length of the drill string may be tens of thousands of feet, this is not a trivial job. One trip can require tens of hours and is a significant expense in the drilling budget. To resume drilling the entire process must be reversed. Thus the bit's durability is very important, to minimize round trips for bit replacement during drilling.

Tungsten Carbide Inserts

The inserts or compacts used in drill bits are made of a super-hard material and a softer binder material which are formed into the desired shape at very high temperatures and pressures. The normal composition is tungsten carbide and from 5 to 17% cobalt in a sintered condition. The inserts are press-fitted into holes drilled into the drill bit. In recent years inserts have been added to areas of steel tooth roller cone bits. A common problem associated with the placement of these inserts and those on other bits is that the steel holding the insert in place erodes and leaves the insert in peril of damage or simply falling out from its pocket. FIG. 7 gives an example of how erosion weakens the area around an insert. In this drawing, body areas 710 adjacent the insert 12 have been washed away by the scouring action of abrasives carried in the drilling mud. If the insert does come out, it does more than simply leave the bit with one less cutting element. The inserts tend to be very dense and is not easily carried away by the drilling mud. Rather, it tends to stay near the bottom of the hole, where its hard nature causes it to knock out following teeth and to quickly destroy the bit. Often, not only must the bit be replaced, but fishing tools can be necessary to remove broken teeth from the hole prior to the resumption of drilling.

Hardfacings

It has become common to coat areas of a bit which are subject to erosion with a layer of hardfacing. An exemplary hardfacing comprises tungsten carbide in a matrix of steel, which is applied to the finished bit by welding. While hardfacings are being used in many high-wear areas of the bit, it has been difficult to apply hardfacings near inserts. This is because the inserts, which are press-fitted into their holes, are often loosened by the heating used in the application of the hardfacing, a counter-productive activity. To prevent this, a margin has generally been left around the inserts when hardfacing is applied.

Thermal spray coatings, such as that shown in U.S. Pat. No. 5,535,838, have been applied over the cutting structure but because of the relative thin layer (0.005" to 0.020") there is minimum protection of the insert and no contribution to the metallurgical bonding of the insert. Thermal spray coatings are not appropriate for steel tooth roller cone rock bits or areas of high wear such as the gage area of a fixed cutter bit or the surf or backface area of a roller cone.

Improved Wear Protection on Rock Bits

The present inventor has realized that wear protection on rock bits can be enhanced by combining features of superhard inserts and deposited hardfacing layers. In order to combine the two, the inserts are welded into place. They may be welded using a hardfacing or weld material or a combination of both. The compacts used can be ordinary compacts or they can be specifically modified to improve their weldability. After the inserts are welded into place, additional hardfacing material is applied to the bit, including the areas immediately adjacent to and even over the inserts. This method produces parts with inserts which are not destroyed during hardfacing and heat treat, as opposed to present methods in which either hardfacings OR pressed inserts alone are used in these high wear areas.

The disclosed innovations, in various embodiments, provide one or more of at least the following advantages:
   ability to intimately combine inserts and hardfacings;
   metal supporting the insert is protected from erosion;
   inserts are less likely to come out of socket;
   savings in time/money from retention of inserts.

BRIEF DESCRIPTION OF THE DRAWING

The disclosed inventions will be described with reference to the accompanying drawings, which show important sample embodiments of the invention and which are incorporated in the specification hereof by reference, wherein:

FIG. 1 shows an embodiment of a rotary cone from a drill bit, showing how the teeth both contain inserts and are covered by hardfacing.

FIG. 2A shows one embodiment of a tooth containing an insert which is covered by the hardfacing.

FIG. 2B shows an alternate embodiment of a tooth containing two inserts which are covered by the hardfacing.

DETAILED DESCRIPTION OF THE PREFERRED EMBODIMENTS

Figure 3:
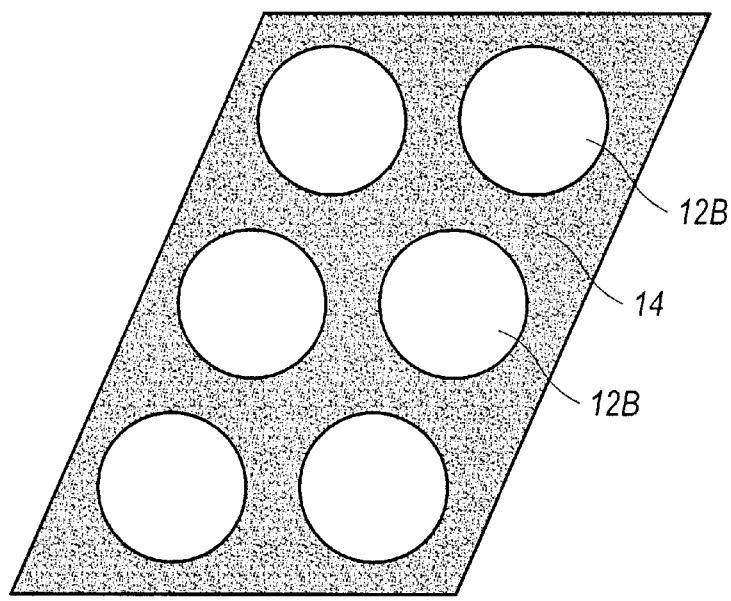
FIG. 3A shows an example of the disclosed combination of inserts and hardfacing being used in a stabilizer pad on a rotary cone drill bit or in a gauge pad on a fixed head drill bit.
FIG. 3B shows an example of the disclosed combination of inserts and hardfacing being used on the backface (surf row) on a roller cone bit.
Figure 3:
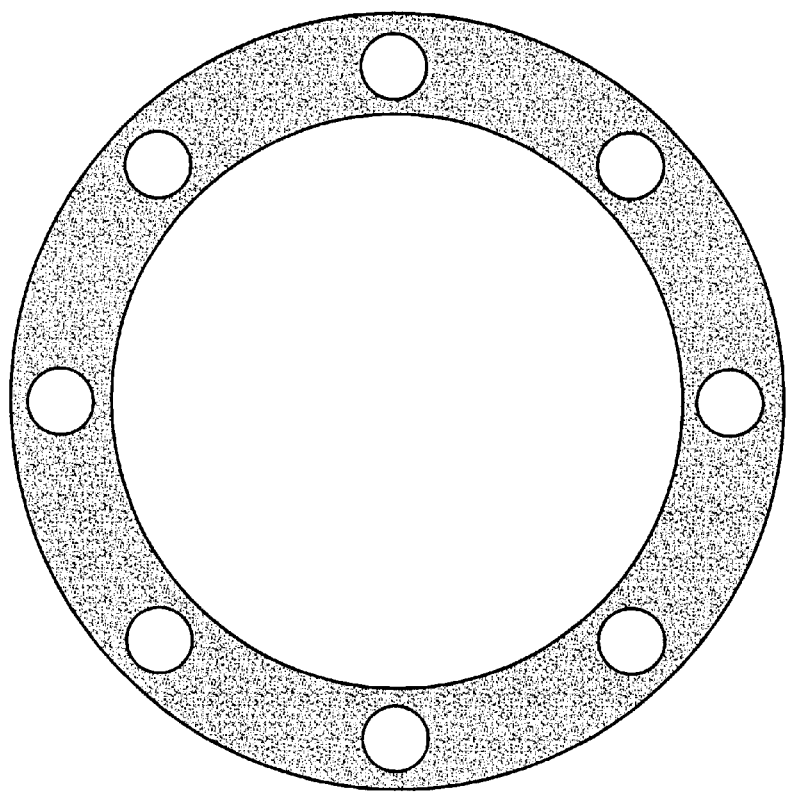
Figure 4:
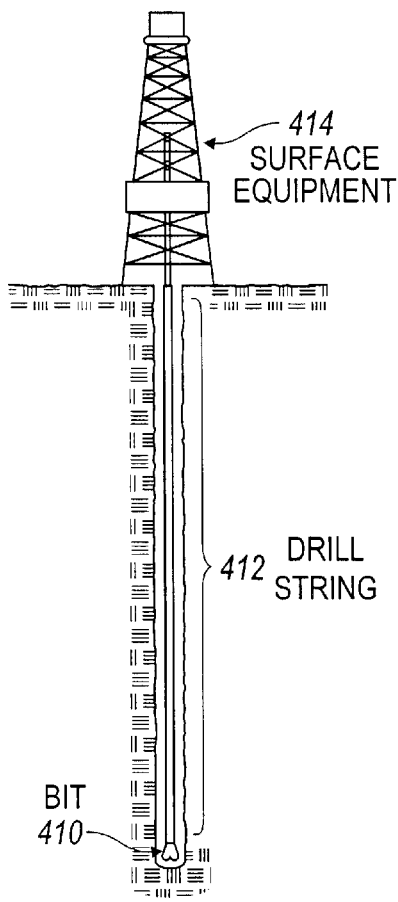
FIG. 4 shows an exemplary drill rig.
Figure 5:
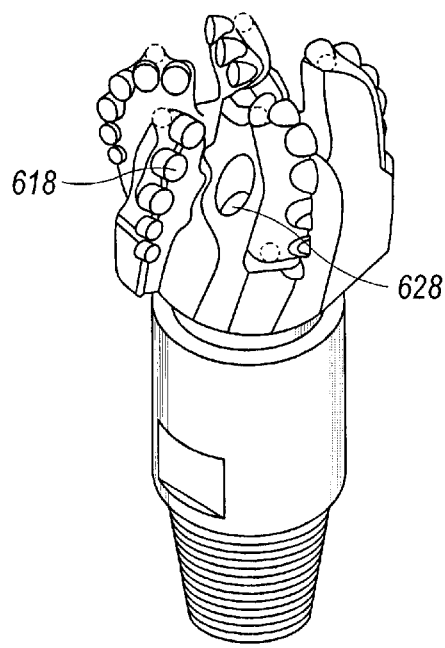
FIG. 5 shows an exemplary fixed cutter drill bit.
Figure 6:
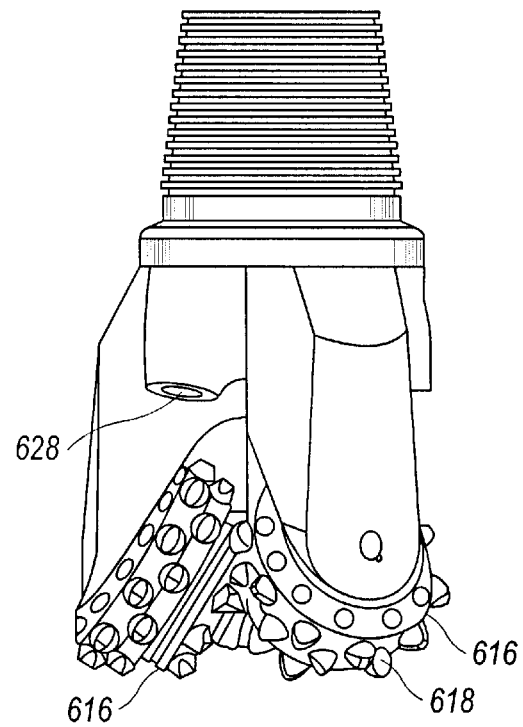
FIG. 6 shows an exemplary rotary cone drill bit.
Figure 7:
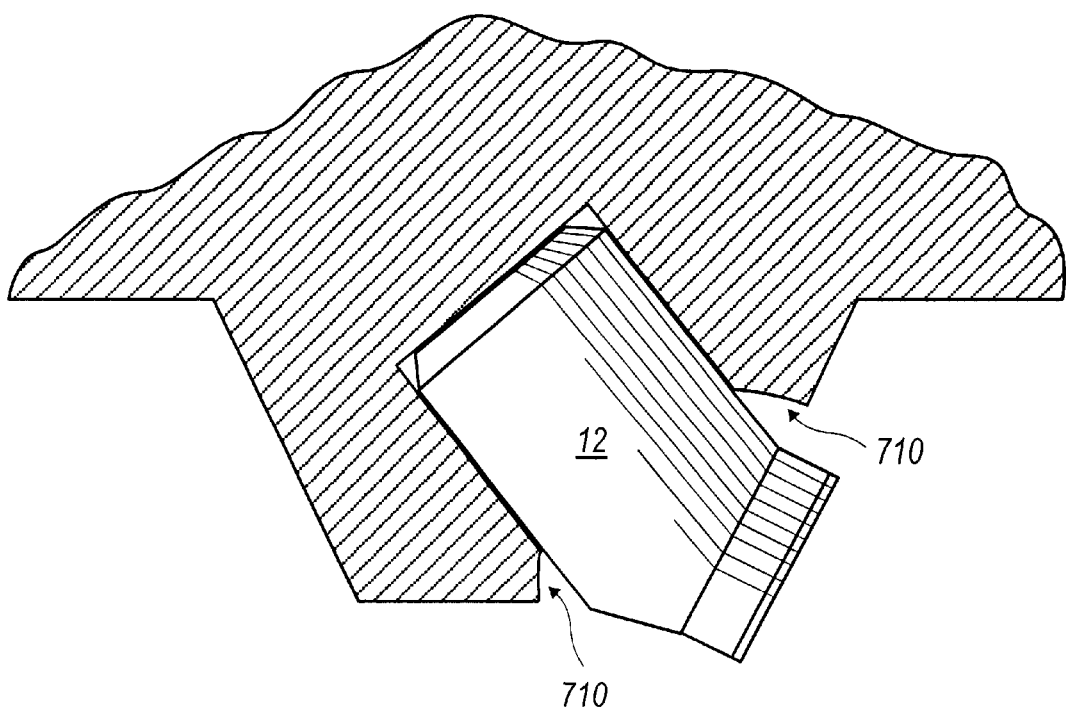
FIG. 7 shows how erosion weakens the area around an insert.

The numerous innovative teachings of the present application will be described with particular reference to the presently preferred embodiment (by way of example, and not of limitation).

This invention specifically addresses the need to enhance the performance of all types of rock drilling bits by allowing the placement of super-hard wear-resistant inserts or segments in areas of high wear, while at the same time, protecting the surrounding area from erosion and providing a metallurgical bond between the insert and the steel body. The intention is to provide maximum wear protection to the high wear areas, such as cutting structures and gage areas on a rock bit, where the wear slows down the penetration rate of the bit and reduces bit life. This is accomplished by welding the highly wear-resistant inserts or segments in these critical wear areas so that one can bring the hardfacing all the way up to the insert or even over it. By bringing the hardfacing into direct contact with the insert, the wear resistance is improved over the current solution of putting the maximum amount of hardfacing in the same area. The insert or segment, because of its composition, can be metallurgically bonded to the hardfacing material and through it to the material of the bit. The insert is more wear resistant than the surrounding hardfacing, thus extending the life of these high wear areas. By encapsulating the insert with hardfacing, the insert and its surrounding area is also protected from erosive wear, which is not the case for a standard pressed insert.

Weldable Insert

The compacts used can be ordinary compacts or they can be specifically modified to improve their weldability. For instance, they can have a weldable coating or sleeve. They can be higher in the matrix material (cobalt, nickel, etc.) than ordinary compacts. They can have ceramic materials (diamonds, etc.) in the carbide substrate with varying matrix materials and matrix percentages.

In the presently preferred embodiment, the insert is composed of tungsten carbide and diamond particles in a cobalt matrix, such as those disclosed in U.S. Pat. No. 6,102,140, which is owned by the assignee of this application and which is hereby incorporated by reference.

For the wear-resistant materials, other acceptable materials include carbides, nitrides, borides, carbonitrides, suicides of tungsten, niobium, vanadium, hafnium, zirconium, chromium, boron, diamond composites, carbon nitride, and mixtures there of. Alternate matrix materials can be cobalt, nickel, copper, iron, or an alloy of any of these. The percent of matrix material in the insert can range from 3% to 50%, with the presently preferred range of 15% to 30%.

The insert (or compact) can be coated or sleeved with a Co, Ni, Cu or Fe based material to protect and aid in the metallurgical bonding process of the insert to the hard metal or weld material and to the base material. This coating or sleeve can be applied by pressing and/or sintering, powder metallurgy, plating, thermal spray, etc., according to known methods. Depending on the method of forming the coating or sleeve, this step can be done while the compact is being formed or afterwards.

The shape of the insert can be rectangular, round, square, triangular or any combination of shape (e.g., a round dowel shaft with an angular flat top). The thickness or diameter of the insert can range from 0.10–1.0 inches. The insert size and location can cover from 1% to 100% of the rock bit cutting structure and gage dimensional areas.

The preferred location of the insert is at the point of contact with the formation. The insert may sit on the leading face, be recessed on the leading face, or in a slot or hole. Inserts can be welded within all teeth or blades or on only some of the teeth or blades on the bit.

Welding/Hardfacing of Insert

The preferred method for welding the insert to the gage tooth is the oxyfuel process using a tube material containing tungsten carbide and diamond particles in an iron matrix. In the presently preferred embodiment of the weld material, tungsten carbide comprises 65–75% and diamond particles comprise 5–10%; the rest of the weld material will be the iron matrix.

Alternate processes and techniques for the application of the hardfacing or weld material are well known to the art. Using these processes and techniques can create a metallurgical bond between the hardfacing or weld material, the insert, and the base material. It is also possible, although not necessary to the practice of the invention, to alter either the composition of the insert or of the weld/hardfacing material to improve the metallurgical bonds.

One alternate technique of hardfacing uses the oxyfuel or atomic hydrogen process with a tube material containing ceramic or carbide particles in a Co, Ni, Cu or Fe based matrix. A second technique is the Thermal Spray Fuse or Plasma Transfer Arc process using powders containing ceramic or carbide particles in a Co, Ni, Cu, or Fe based matrix. A third technique is an arc welding process, such as shielded metal arc welding (SMAW), gas tungsten arc welding (GTAW), gas metal arc welding (GMAW), flux core arc welding (FCAW), and pulse gas metal arc welding (pulse GMAW), using a welding consumable containing ceramic or carbide particles in a Co, Ni, Cu or Fe based matrix. All techniques and processes can also be used with a welding consumable composed of a Co, Ni, Cu, or Fe based alloy without ceramic or carbide particles in their composition.

FIG. 3A shows an example of the disclosed combination of inserts and hardfacing being used in a stabilizer pad on a rotary cone drill bit or in a gauge pad on a fixed head drill bit.

Sample Embodiment: Roller-Cone Bit

In an exemplary embodiment for a roller cone, shown in FIG. 1, the teeth 10 both contain inserts 12 and are covered by hardfacing 14. Inserts 12 placed in the inner row teeth will extend to the surface of the hardfacing 14 or slightly below the surface of the hardfacing. In several test bits, the inserts 12A in the inner rows were placed slightly below the hardfacing 14 surface for appearance reasons, and for ease of application of the hardfacing (it was easier for hardfacing operators to weld over the inserts than weld up to them). However, it is preferred to have the inserts as close to the surface as possible. FIG. 2A shows an embodiment of a tooth containing a single insert which is covered by the hardfacing. FIG. 2B shows an alternate embodiment of a tooth containing two inserts covered by the hardfacing.

The compacts or inserts 12B placed at the heel area of the gage teeth and in the gage surfaces are ground after the hardfacing application to ensure that the gage will not be oversize. Therefore, these inserts are placed in their slots or holes so they will be exposed to the surface after gage grind. These inserts can be seen in FIG. 1, or in FIG. 3B, which shows the back side (surf row) on a roller cone bit.

Sample Embodiment: Fixed-Cutter Bit

FIG. 3A shows an exemplary gage pad for a fixed-cutter bit. Gage inserts 12B, like their roller cone counterparts, are ground after hardfacing, and are placed to be exposed after gage grind.

According to a disclosed class of innovative embodiments, there is provided: A drill bit comprising: a body having an first end configured for attachment to a drill string and a second end, opposite said first end, for removing material from a borehole; a plurality of inserts embedded in said second end of said body, said inserts comprising a material which is harder than said body; hardfacing which covers at least a portion of said body, said hardfacing being immediately adjacent said plurality of inserts.

According to another disclosed class of innovative embodiments, there is provided: A downhole component for use in drilled boreholes in rock, comprising: a body which carries one or more functional components; a mechanical connection for supporting said body within the borehole; and abrasion-resistant surfaces on said body, at points where said body can contact said borehole, comprising at least one insert of a material which is harder than said body, and encapsulation material which is softer than said insert and which laterally surrounds said insert wherever said insert protrudes from a surface of said body.

According to another disclosed class of innovative embodiments, there is provided: A rotary drilling system, comprising: a drill string which is connected to conduct drilling fluid to a bit from a surface location; and a rotary drive which rotates at least part of said drill string together with said bit; a drill bit which is attached to said drill string for removing rock when rotating; a plurality of inserts welded in said drill bit, said inserts comprising a material which is harder than said drill bit; hardfacing which covers at least a portion of said drill bit which is intimately attached to one of said plurality of inserts.

According to another disclosed class of innovative embodiments, there is provided: A method for fabricating a drill bit, said method comprising the steps of: forming a body of said drill bit; forming a plurality of holes in portions of said body to receive inserts which are harder than said body; fastening a plurality of inserts in said holes; coating portions of said drill bit with a hardfacing material, wherein at least one of said inserts is in intimate contact with said hardfacing material.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

It is also specifically contemplated that the disclosed inventions are not limited to drill bits, but can be used in core bits, reamers, and hole openers, and similar equipment.

It is also specifically contemplated that the disclosed inventions are not limited to components which themselves remove rock, but can be used in downhole motors, bent subs, workover tools, or wherever else great abrasion resistance is needed. This is particularly advantageous at maximum-diameter points of drill string components where contact with rock can be expected.

Additional general background, which helps to show the knowledge of those skilled in the art regarding implementation options and the predictability of variations, may be found in the following publications, all of which are hereby incorporated by reference: Baker, A Primer of Oilwell Drilling (5.ed. 1996); Bourgoyne et al., Applied Drilling Engineering (1991); Davenport, Handbook of Drilling Practices (1984); Drilling (Australian Drilling Industry Training Committee 1997); Fundamentals of Rotary Drilling (ed. W. W. Moore 1981); Harris, Deepwater Floating Drilling Operations (1972); Maurer: Advanced Drilling Techniques (1980); Nguyen, OIL AND GAS FIELD DEVELOPMENT TECHNIQUES: DRILLING, (1996 translation of 1993 French original); Rabia, Oilwell Drilling Engineering/Principles and Practice (1985); Short, Introduction to Directional and Horizontal Drilling (1993); Short, Prevention, Fishing & Repair (1995); Underbalanced Drilling Manual (Gas Research Institute 1997); the entire PetEx Rotary Drilling Series edited by Charles Kirkley, especially the volumes entitled MAKING HOLE (1983), DRILLING MUD (1984), and THE BIT (by Kate Van Dyke, 4.ed. 1995); the SPE reprint volumes entitled "Drilling," "Horizontal Drilling," and "Coiled-Tubing Technology"; and the Proceedings of the annual IADC/SPE Drilling Conferences from 1990 to date; all of which are hereby incorporated by reference.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A drill bit comprising:
   a body having an first end configured for attachment to a drill string and a second end, opposite said first end, for removing material from a borehole;
   a plurality of inserts embedded in said second end of said body, said inserts comprising a material which is harder than said body;
   hardfacing which covers at least a portion of said body, said hardfacing being in direct contact with said plurality of inserts.

2. The drill bit of claim 1, wherein all of said plurality of inserts are covered by said hardfacing.

3. The drill bit of claim 1, wherein at least some of said plurality of inserts are covered by hardfacing.

4. The drill bit of claim 1, wherein some but not all of said plurality of inserts are covered by hardfacing.

5. The drill bit of claim 1, wherein said inserts are attached to cones which are themselves attached to said body through a rotary joint.

6. The drill bit of claim 1, wherein said drill bit is a fixed head bit.

7. The drill bit of claim 1, wherein said inserts are attached to said drill bit by welding.

8. A downhole component for use in drilled boreholes in rock, comprising:

a body which carries one or more functional components;

a mechanical connection for supporting said body within the borehole; and abrasion-resistant surfaces on said body, at points where said body can contact said borehole, comprising
      at least one insert of a material which is harder than said body, and
      encapsulation material which is softer than said insert and which laterally surrounds said insert wherever said insert protrudes from a surface of said body.

9. The component of claim 8, wherein said encapsulation material is harder than said body.

10. The component of claim 8, wherein said downhole component is a hole opener.

11. The component of claim 8, wherein said downhole component is a reamer.

12. The component of claim 8, wherein said body is composed of ferrous metal.

13. The component of claim 8, wherein said encapsulation material totally surrounds said insert, except where said encapsulation material has been ground back to expose a gage surface of said insert.

14. The component of claim 8, wherein said body is threaded to mate with other components of a drill string.

15. The component of claim 8, wherein said body has an internal passage for the delivery of drilling fluid.

16. The component of claim 8, wherein said functional components are integral with said body.

17. The component of claim 8, wherein said functional components include roller cones.

18. The component of claim 8, wherein said functional components include fixed cutters.

19. The component of claim 8, wherein inserts are attached to said body by welding.

20. A rotary drilling system, comprising:

a drill string which is connected to conduct drilling fluid to a bit from a surface location; and a rotary drive which rotates at least part of said drill string together with said bit;

a drill bit which is attached to said drill string for removing rock when rotating;

a plurality of inserts welded in said drill bit, said inserts comprising a material which is harder than said drill bit;

hardfacing which covers at least a portion of said drill bit, said hardfacing laterally surrounding ones of said plurality of inserts.

21. A method for fabricating a drill bit, said method comprising the steps of:

forming a body of said drill bit;

forming a plurality of holes in portions of said body to receive inserts which are harder than said body;

fastening a plurality of inserts in said holes;

coating portions of said drill bit with a hardfacing material, wherein at least one of said inserts is laterally surrounding said hardfacing material.

22. The process of claim 21, wherein at least some of said plurality of inserts are secured in said holes by welding.

23. The process of claim 21, wherein at least some of said plurality of inserts are covered by said hardfacing in said coating step.

24. The process of claim 23, further comprising the step of grinding back said hardfacing to expose at least some of said plurality of inserts.

25. The process of claim 23, further comprising the step of grinding back said hardfacing to expose at least some ones of said plurality of inserts while leaving other ones of said plurality of inserts covered.

26. The process of claim 23, wherein said step of grinding exposes ones of said plurality of inserts which are in a gage row and leaves ones of said plurality of inserts which are in inner rows covered.

* * * * *